(12) United States Patent
Schmidt et al.

(10) Patent No.: US 10,818,897 B2
(45) Date of Patent: Oct. 27, 2020

(54) CONNECTION ELEMENT FOR A BATTERY BOX, AND BATTERY BOX AND METHOD FOR THE PRODUCTION THEREOF

(71) Applicant: Linde + Wiemann SE & Co. KG, Dillenburg (DE)

(72) Inventors: Werner Schmidt, Alzenau (DE); Marcel Georg, Dillenburg (DE); Michael Solbach, Wenden (DE)

(73) Assignee: Linde + Wiemann SE & Co. KG, Dillenburg (DE)

( * ) Notice: Subject to any disclaimer, the term of this patent is extended or adjusted under 35 U.S.C. 154(b) by 47 days.

(21) Appl. No.: 16/316,966

(22) PCT Filed: Aug. 1, 2017

(86) PCT No.: PCT/EP2017/069479
§ 371 (c)(1),
(2) Date: Jan. 10, 2019

(87) PCT Pub. No.: WO2018/029050
PCT Pub. Date: Feb. 15, 2018

(65) Prior Publication Data
US 2019/0305275 A1   Oct. 3, 2019

(30) Foreign Application Priority Data

Aug. 10, 2016 (DE) .......... 10 2016 114 856

(51) Int. Cl.
*B60K 1/04* (2019.01)
*H01M 2/10* (2006.01)
(Continued)

(52) U.S. Cl.
CPC ............. *H01M 2/1083* (2013.01); *B60K 1/04* (2013.01); *B60L 50/66* (2019.02); *F16B 37/005* (2013.01);
(Continued)

(58) Field of Classification Search
CPC ........................................................ B60K 1/04
See application file for complete search history.

(56) References Cited

U.S. PATENT DOCUMENTS

2009/0139781 A1* 6/2009 Straubel ................. B60L 50/64
180/65.1
2017/0025655 A1   1/2017 Klimek et al.

FOREIGN PATENT DOCUMENTS

DE   102011077330 A1   12/2012
DE   102015111749 A1   1/2017
EP       2768045 A1    8/2014

* cited by examiner

*Primary Examiner* — John D Walters
*Assistant Examiner* — James J Triggs
(74) *Attorney, Agent, or Firm* — Rogowski Law LLC

(57) ABSTRACT

The invention relates to a connecting element (1) to connect a battery cell (15) of an electric vehicle (16) to a battery box (10), wherein the connecting element (1) has at least one connecting section (5) for connection to the battery cell and is joined to the battery box (10). The problem addressed by the invention is that of being able at least largely to dispense with the need to use filler material when joining the connecting element to the baseplate of the battery box so as to improve its quality and make it more cost-effective. The problem is solved by a connecting element (1) that has at least one joining section (2) for securely connecting the connecting element to the battery box (10).

14 Claims, 5 Drawing Sheets

(51) Int. Cl.
*B60L 50/60* (2019.01)
*F16B 37/00* (2006.01)
*F16B 37/02* (2006.01)
*F16B 37/06* (2006.01)
*F16B 5/08* (2006.01)

(52) U.S. Cl.
CPC ............ *F16B 37/02* (2013.01); *F16B 37/061* (2013.01); *H01M 2/1077* (2013.01); *F16B 5/08* (2013.01); *H01M 2220/20* (2013.01)

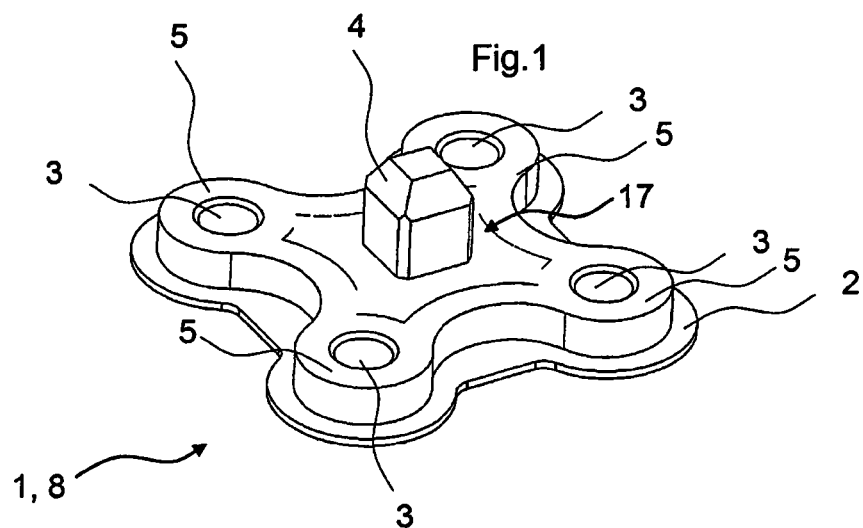
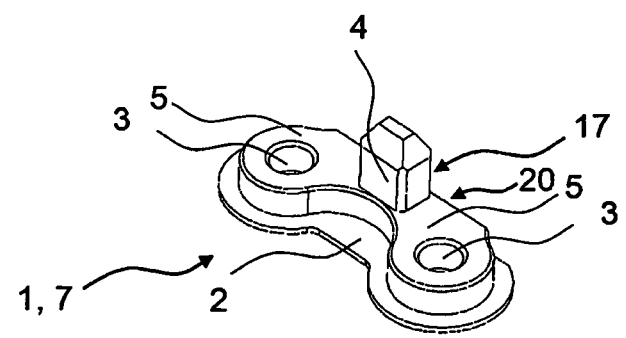
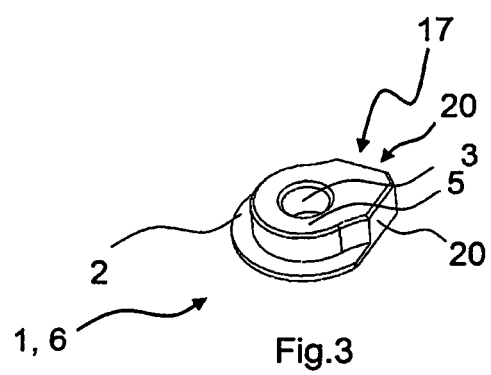

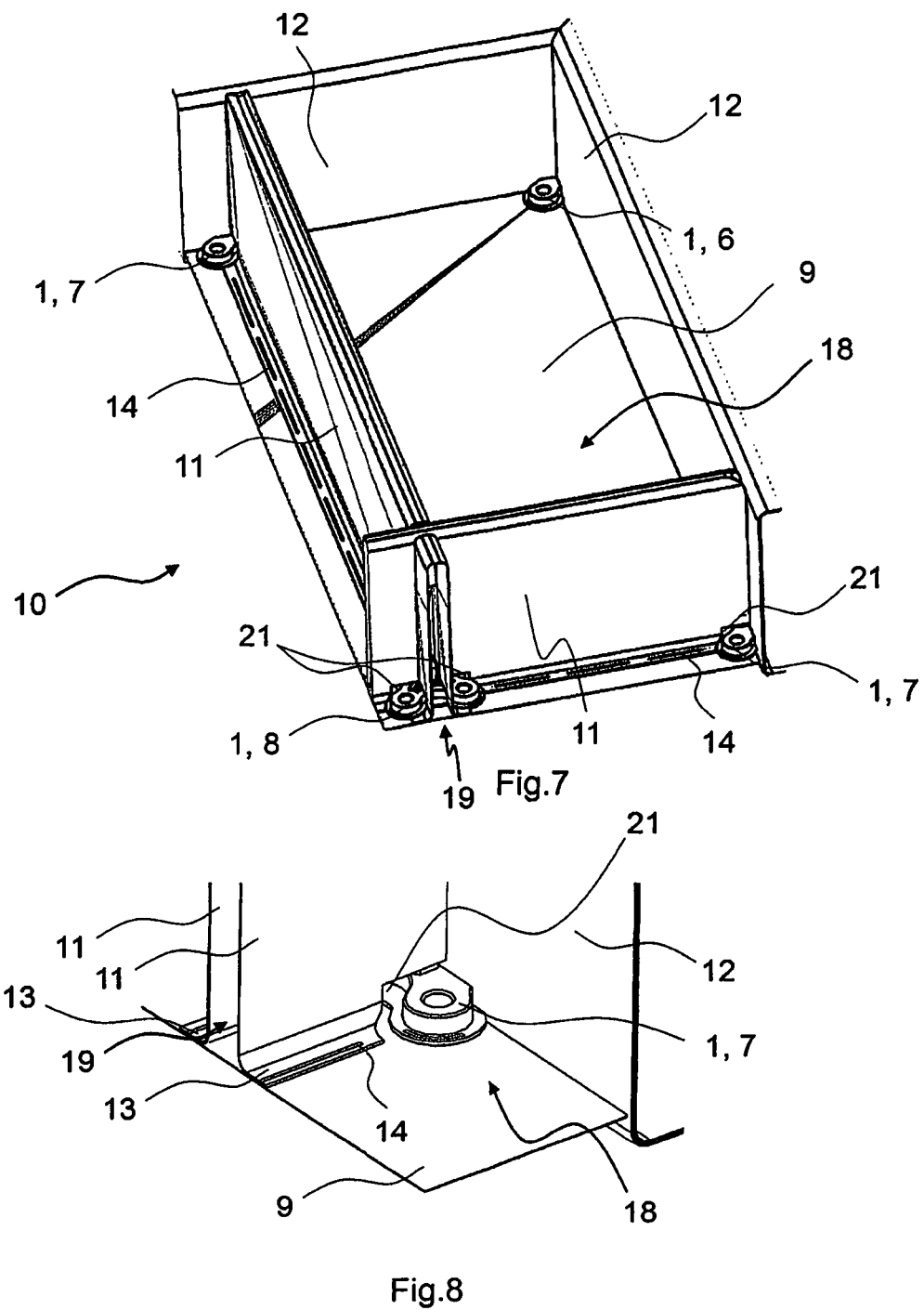

CONNECTION ELEMENT FOR A BATTERY BOX, AND BATTERY BOX AND METHOD FOR THE PRODUCTION THEREOF

CROSS-REFERENCE TO RELATED APPLICATIONS

This application is a national stage application (under 35 USC § 371) of PCT/EP2017/069479, filed Aug. 1, 2017, which claims benefit of German application No. 10 2016 114 856.3, filed Aug. 10, 2016, the contents of each of which are incorporated by reference herein.

BACKGROUND OF THE INVENTION

Technical Field and State of the Art

The invention relates to a connecting element to connect a battery cell to a battery box of an electric vehicle, as well as to a battery box and also to a production method for producing a battery box.

The units employed in electric vehicles as electric energy storage devices—hereinafter referred to as batteries—are often integrated in the manner of modules into individual, separate cells—hereinafter referred to as battery cells. For instance, such battery cells can consist of rechargeable secondary cells which are normally referred to as accumulators. The individual cells of the electric energy storage device are electrically connected to each other to form the so-called battery having the envisaged operating voltage and energy capacity.

When it comes to large-scale mass production, so-called battery boxes are provided which hold the individual battery cells. Each individual battery cell is mechanically connected to the battery box in order to prevent it from sliding during operation. On the one hand, the battery box serves as a modular assembly which simplifies the serial production of a vehicle. On the other hand, the battery box protects the battery cells against environmental influences as well as against damage caused by mechanical effects of the kind that can occur, for example, in case of an accident.

For instance, the battery cells can be screwed to the battery box on the inside. For this purpose, connecting elements—which are referred to, among other things, as screw nodes, screw points, screw bosses or screw blocks—are connected to a baseplate of the battery box. The individual battery cells are then screwed to the connecting elements. The connecting elements can be situated between partition plates of a battery register that spatially separates the individual cells from each other and that can contribute to the mechanical stability of the battery box.

The connecting elements can have a connecting section in which a hole is provided in order to allow a mechanical connection, for example, a screwed connection. In order to ensure enough space and stability for the mechanical connection—for instance, by creating a sufficient screwing length—the height of the connecting element is greater than the thickness of the baseplate of the battery box, at least in the area of the connecting section.

The baseplate of the battery box also serves to seal off the underside of the battery box. As a rule, the baseplate has a closed configuration and the above-mentioned connecting elements are joined on the inside of the baseplate.

For this purpose, it is conceivable that, in the area of their connecting sections, the connecting elements are welded to the baseplate of the battery box by means of a fillet weld using a filler material. Aside from the drawback of the excessive production resources involved, it has been found that the heat input during welding can cause the baseplate to become warped and to melt to an impermissible extent in some places. After all, the connecting section, which is configured so as to be fairly massive in comparison to the baseplate, requires a relatively high heat input in order to melt, and this can concurrently cause a premature melting of the baseplate, with all of the above-mentioned drawbacks that this entails.

European patent application EP 2 768 045 A1 describes a battery device for a vehicle, comprising a battery module that consists of a plurality of battery cells. The battery module is arranged on the top of a support of the battery housing. A lid is provided to cover the battery module.

German patent application DE 10 2015 111 749 A1 discloses a battery device for an electrically powered vehicle and a method for the production of such a battery device. The battery device has a plurality of battery modules with battery cells. A receiving device that accommodates the battery modules comprises a partition wall arranged underneath the battery module and a baseplate arranged underneath the partition wall.

Before the backdrop of the disadvantages described above, the invention has an objective of at least largely dispensing with the need to use filler material during the joining process and of configuring the joining connection to the baseplate of the battery box so as to improve its quality and to make it more cost efficient.

SUMMARY OF THE INVENTION

The connecting element according to an embodiment of the invention has, in addition to the connecting section, a joining section in order to establish a secure connection to the battery box. In this manner, on the one hand, the connecting element can be optimized for establishing a mechanical connection to the battery cell and, on the other hand, it can be configured to be securely connected to the battery box at the joining section in order to fulfill various requirements there.

The invention is based on the idea that, for example, in order to establish a screwed connection, it is necessary to have a relatively massive connecting section that can absorb the forces from a screwed connection and that should also provide a certain screwing length for a stud. A joining section that is dimensioned for the joining method is provided in order to establish a secure connection to the battery box. The term "joining method" refers especially to methods such as, for example, welding, that effectuate the input of heat into the components that are to be joined. The provision of the joining section, for instance, allows the heat capacity of the joining section to be locally adapted to the heat capacity of the section of the baseplate that is to be joined, as a result of which an impermissible heating of both components at the joining site can be avoided or at least reduced.

In an advantageous embodiment, it can be provided that the joining section is configured so as to be adjacent to the connecting section. This makes it possible to design the connecting element so that it is particularly compact and nevertheless mechanically stable. Moreover, this simplifies the ease of production of the connecting element.

In another advantageous embodiment, it can be provided for the joining section to be configured as a sheet-like lamella that runs along the outer contour of the connecting element, at least in certain sections. The lamella can be configured like a web. The configuration of the joining section as a sheet-like lamella creates similar mechanical conditions between the baseplate and the joining section, as a result of which the joining method is considerably simplified. A lamella running along the outer contour of the connecting element also contributes to creating a compact design as well as to simplifying the joining process since the joining section is easily accessible. If the sheet-like lamella is only provided in certain sections on the outer contour, the material needed for the joining section can be kept to a minimum since, in automotive engineering, it is fundamentally possible to dispense with the use of unnecessary and thus expensive and heavy materials. If the sheet-like lamella is designed in such a way that it is configured along the entire outer contour of the connecting element, this allows the connecting element to be used universally in differently designed battery boxes. Moreover, this simplifies the ease of production of the connecting element.

In a preferred embodiment, the connecting section can have a thickness of about 0.75 mm to about 1.75 mm, preferably 1 mm to 1.5 mm, especially 1.5 mm. Within these ranges, one attains a particularly good adaptation to the thickness of the normally employed baseplate, which, in turn, can have a thickness of about 0.5 mm to about 1.5 mm, preferably 0.5 mm to 1 mm. All in all, the connecting section can be fundamentally configured in such a way that the thickness of the joining section exhibits a ratio of about 1:1 to about 1.3 relative to the thickness of the baseplate.

Preferably, it can be provided for the joining section to be configured in one piece with the connecting section. This simplifies the production of the connecting element and improves its mechanical stability.

Preferably, it can be provided for the connecting element to be configured as a fine-cast component, a cold-extruded component or a sheet-metal component. These production methods have proven to be particularly advantageous and cost efficient for mass production. Moreover, it is very easy to shape the joining section onto the connecting element in a single work step.

Moreover, it can be provided that, during the single production process, additional features of the connecting element are concurrently formed such as, for instance, an inner thread in the hole of the connecting section.

Advantageously, the connecting element can be made of a weldable metal or a weldable alloy, especially steel or an aluminum alloy. These materials can be processed particularly well by means of the preferred shaping or primary forming methods employed for the production of the connecting element as well as during the joining to the baseplate. Moreover, especially steel and aluminum display high mechanical strength in order to create mechanical connections.

The objective is also achieved by a battery box for an electric vehicle, having a baseplate as well as a connecting element according to the invention that is joined thereto.

Advantageously, it can also be provided that the battery box has at least one partition plate to separate a first battery cell from a second battery cell. On the one hand, a partition plate can enhance the mechanical stability of the battery box. In addition or as an alternative, it serves to spatially separate the individual battery cells, as a result of which, for example, the battery cells are protected against detrimental effects of adjacent battery cells in case of a fault.

Moreover, it can be provided for the connecting element to be joined to the baseplate in the area of the joining section, preferably by means of welding, especially by means of laser welding. Joining the connecting element in the area of the joining section, especially by means of welding, permits a particularly cost-efficient, fast and reliable connection of the connecting element to the baseplate. The use of a welding process to join the joining section to the baseplate translates into an especially cost-efficient and fast production. Laser welding has proven to be particularly advantageous since it does not call for mechanical contact between a welding electrode and the components, so that the work involved in clamping and the need for such equipment can be kept to a minimum.

Preferably, it can also be provided for the at least one partition plate to have at least one joining flange that is connected to the baseplate in the same manner as the connecting element. This allows the use of the same joining method for the connecting element as well as for the partition plate, as a result of which the production of the battery box is rendered simpler and more cost efficient. Moreover, the installation of the connecting element and of the partition plates allows the battery box to be manufactured with greater dimensional accuracy since, first of all, the at least one partition plate and the at least one connecting element can already be centered and aligned with respect to each other and relative to the baseplate as well as, if applicable, to the other components, before the final joining of the components to the baseplate is carried out.

Especially preferably, it can be provided that the thickness of the baseplate and the thickness of the at least one joining section exhibit a ratio of about 1:1 to 1:3. Very little deformation of the baseplate is to be expected within this range.

Preferably, the baseplate has a thickness between about 0.5 mm and about 1 mm. Within this range, the mechanical strength of the baseplate vis-à-vis the weight of the baseplate is optimally utilized.

The objective is also achieved by a method for the production of a battery box for an electric vehicle. According to this method, the connecting element is first arranged on the baseplate and subsequently welded to it. In particular, this can be done by means of laser welding. In this context, a connecting element according to the invention is preferably employed to produce the battery box according to the invention.

In a preferred embodiment of the method, at least one partition plate can be arranged on the baseplate between the steps during which the connecting element is placed on the baseplate and welded to the baseplate, whereby the partition plate and the connecting element are then successively welded to the baseplate in the same manner. This allows at least the baseplate, the at least one partition plate as well as the at least one connecting element to be spatially arranged and aligned with respect to each other before these components are transferred into a joining device, where they are joined in practically one single work step.

DESCRIPTION OF THE DRAWINGS

Additional objectives, advantages, features and application possibilities of the present invention ensue from the description below of an embodiment making reference to the drawings. In this context, all of the described and/or depicted features, either on their own or in any meaningful combination, constitute the subject matter of the present invention, also irrespective of their compilation in the claims or the claims to which they refer back.

The following is shown, at times in a schematic view:

FIG. 1 a perspective view of a crosswise connecting element according to the invention;

FIG. 2 a perspective view of a side connecting element according to the invention;

FIG. 3 a perspective view of a corner connecting element according to the invention;

FIG. 7 a perspective view of part of a battery box with connecting elements according to the invention;

FIG. 8 a perspective view of a detailed section of a battery box with a connecting element according to the invention;

DETAILED DESCRIPTION

Figure 4:
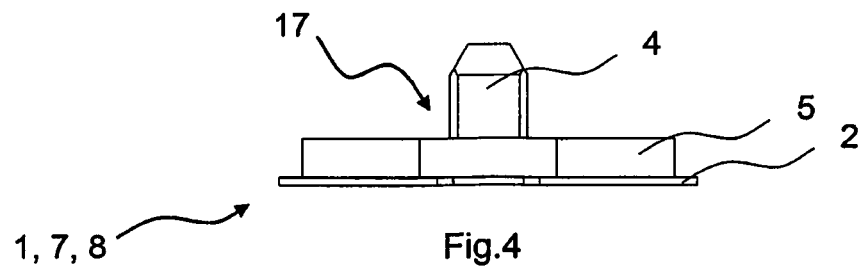
FIG. 4 a side view of a connecting element in the form of a side connecting element or of a crosswise connecting element.

For the sake of clarity, identical components or those having the same effect are provided with the same reference numerals in the figures of the drawings shown below, making reference to several embodiments.

FIG. 1 shows a connecting element 1 according to the invention, having a joining section 2 that extends in the form of a lamella or "web" or flange along a connecting section 5 of the connecting element 1.

The present connecting element 1, provided by way of an example, has a total of four connecting sections 5 that are opposite from each other and crosswise relative to a central section 17 of the connecting element 1. A centering cam 4 on which other components can be aligned is provided in the central section 17 of the connecting element 1.

Figure 11:
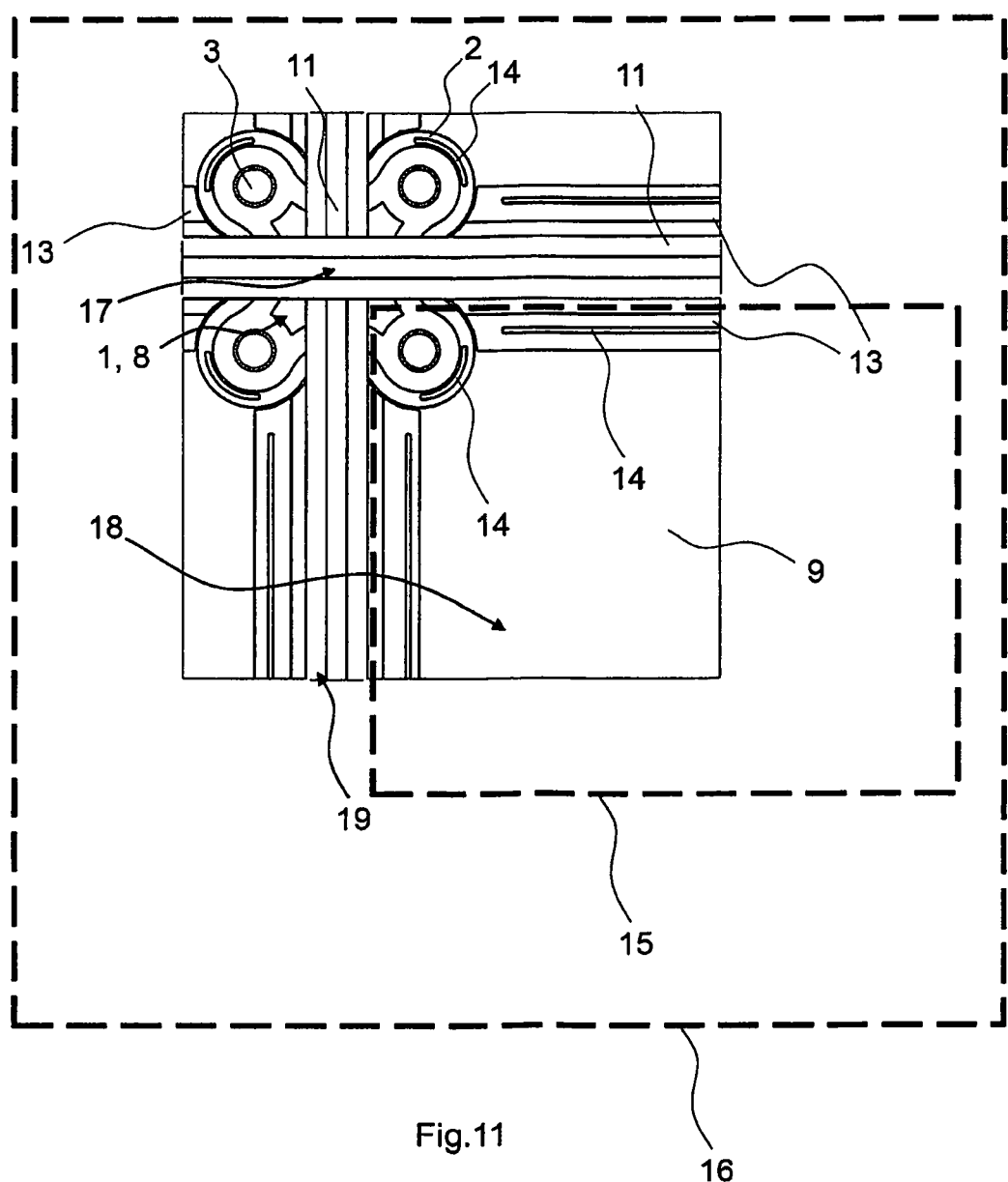
FIG. 11 a section of a top view of a battery box according to the invention, with a schematic depiction of a battery cell as well as of an electric vehicle.

Each connecting section 5 has a hole which, in the present case, is configured as a through hole 3. In all of the embodiments, this hole can have an inner thread (not shown here) that serves to create a screwed connection to a battery cell 15 shown schematically in FIG. 11. In this context, the inner thread can already be provided on the connecting element during the production of the connecting element 1. However, it is also possible to provide the through hole 3 only on the connecting element 1 into which a self-cutting screw or a self-cutting stud is then screwed within the scope of the assembly of the battery cell 15, a process in which an inner thread is then created in the hole.

FIG. 2 shows a connecting element 1 according to the invention which differs from the one depicted in FIG. 1 in that it is a side connecting element 7 with only two connecting sections 5. Here, too, a centering cam 4 is provided in the central section 17. Said cam is adjacent to a planar side surface 20 which, in the installed state, is in contact with a side plate 12 of a battery box 10 or is opposite from the side plate 12. This is shown, for example, in FIGS. 7 and 8.

FIG. 3 shows a connecting element 1 that is configured here in the form of a corner connecting element 6. The corner connecting element 6 has two planar side surfaces 20 which, in the installed state in the battery box 10, are adjacent to the side plate 12 of the battery box 10 or are opposite from the side plate 12. This is shown, for example, in FIG. 7.

FIG. 4 shows a side view of a connecting element 1 according to the invention in the form of a side connecting element 7 or of a crosswise connecting element 8, where it can be seen that the "web" that encircles the side lamella and that forms the joining section 2 is considerably thinner than the appertaining joining section 5.

Figure 5:
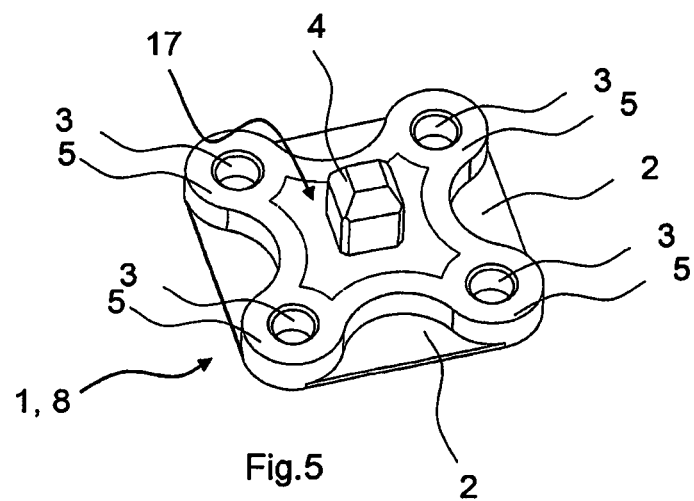
FIG. 5 a perspective view of an alternative embodiment of a crosswise connecting element.

FIG. 5 shows an alternative embodiment of a crosswise connecting element 8, whereby the joining section 2 is only formed in certain sections on the outer contour of the connecting element 1, namely, between the legs of the connecting sections 5 that are situated crosswise and opposite from each other. This construction is particularly compact and allows the connecting element 1 to be welded to a baseplate 9 of the battery box located underneath it precisely inside the outer contour of the connecting element 1 defined by the connecting sections 5.

Figure 6:
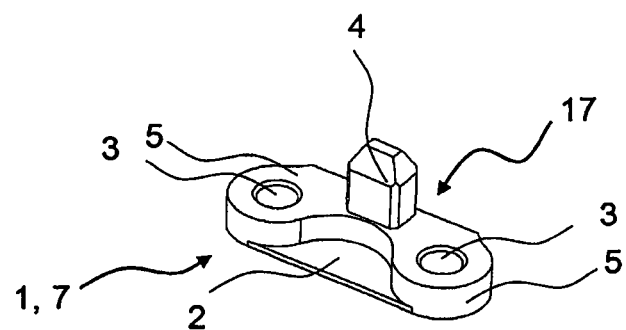
FIG. 6 a perspective view of an alternative embodiment of a side connecting element.
Figure 9:
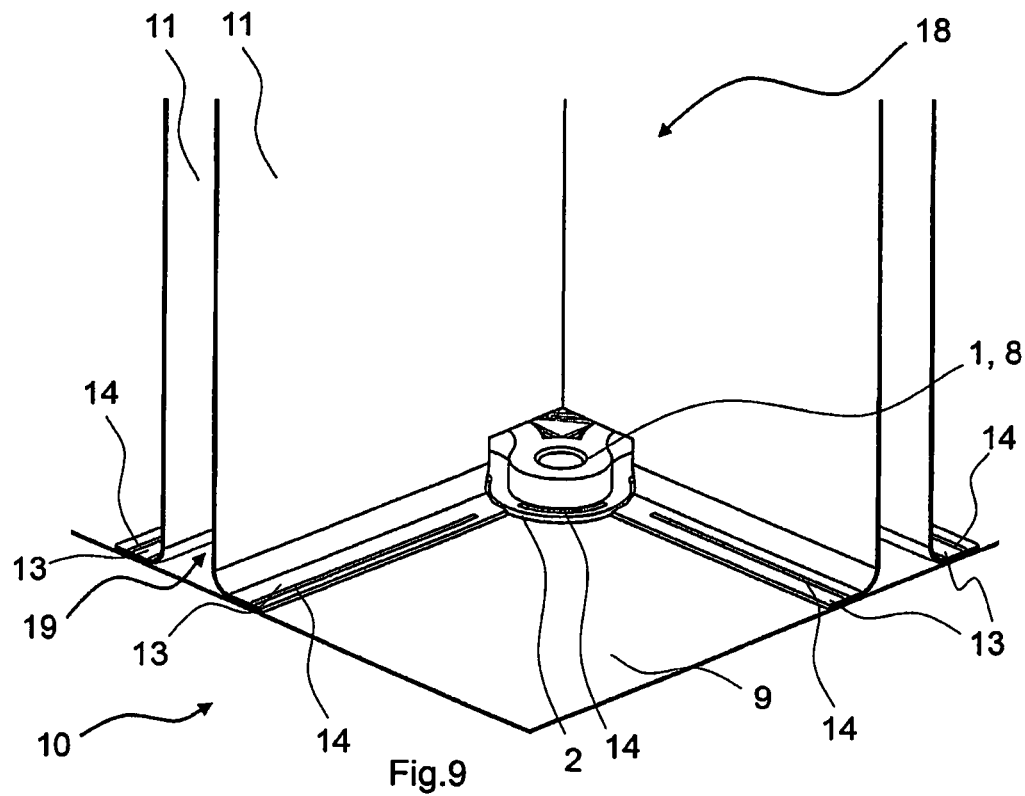
FIG. 9 another perspective detailed view of a battery box with connecting elements according to the invention.
Figure 10:
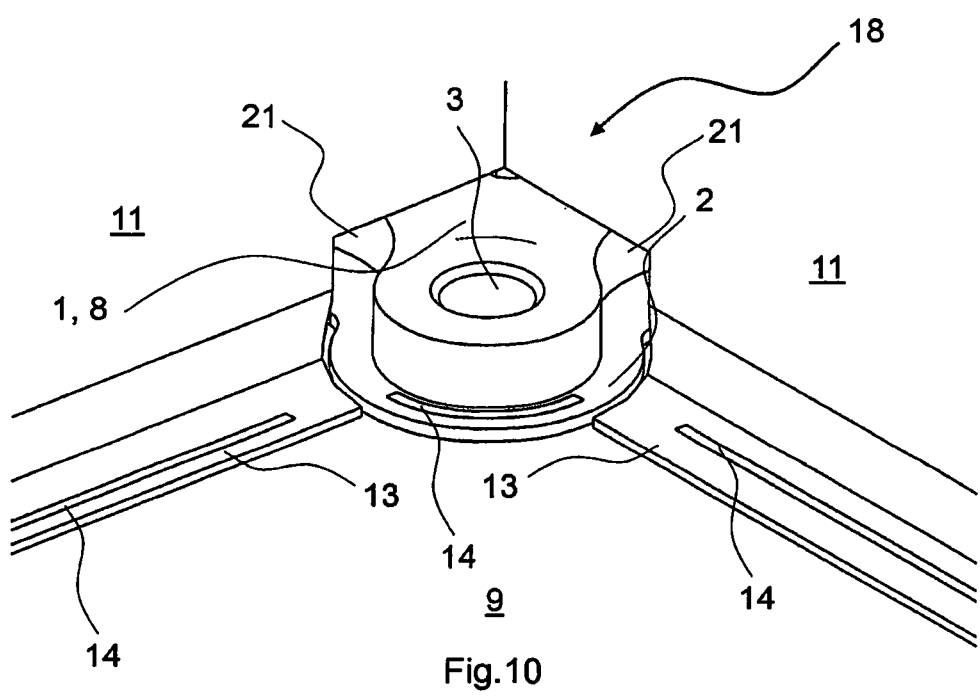
FIG. 10 an enlarged depiction of part of the view shown in FIG. 9.

FIG. 6 shows an alternative embodiment of a side connecting element which, in contrast to the side connecting element 7 shown in FIG. 2, has only one sheet-like lamella of the joining section 2 between the two legs of the connecting sections 5. Consequently, the embodiment depicted in FIG. 6 adheres to the same principle as the embodiment of FIG. 5.

FIG. 7 shows a perspective partial view of the already partially installed battery box 10 which is laterally delimited by side plates 12 that are in contact with the baseplate 9.

The connecting element 1 shown in the upper right-hand corner of FIG. 7 is a corner connecting element 6 whose side surfaces 20 are adjacent to the side plates 12. The connecting elements shown in the upper left-hand and lower right-hand corners are each side connecting elements 7 whose planar side surfaces 20 are adjacent to the appertaining side plate 12 of the battery box 10. The central section 17 having the centering cam 4 is concealed by a partition plate 11 in the side connecting elements 7. In FIG. 7, the partition plates 11 as well as the side plates 12 define a cell compartment 18 into which a battery cell 15 is placed that can be screwed to the connecting sections 5 of the connecting elements 1.

In this context, the partition plates 11 define a separation area 19, each forming the interstice between two battery cells 15 that have been installed in the battery box 10.

For the sake of improving the mechanical stability, the side plates are bent so as to be C-shaped and are then joined to the baseplate 9.

In the present embodiment, the partition plates 11 are configured as O-shaped plates that are open downwards and that are bent outwards at the end of the legs to form a joining flange 13. The legs of the joining flange 13 are in contact with the baseplate 9 of the battery box 10. In the area of each of the connecting elements 1, there is a recess 21 that accommodates the central section 17 of the appertaining connecting element 1.

In the area of the flanges 13 or in the area of the joining sections 2, the partition plates 11 as well as the connecting elements 1 are welded to the baseplate 9, thereby forming weld seams 14. The weld seams 14 are shown in FIGS. 7, 8, 9, 10 and 11, and they extend linearly over the appertaining joining section 2 or over the flange 13. In the present embodiment, the welding process is carried out by means of laser welding, whereby the jet of the welding laser is aimed at the surface of the appertaining joining section 2 or flange 13 and is focused onto the interface of the joining sections 2 and the baseplate 9 or else onto the interface of the flange 13 and the baseplate 9.

In the embodiments of the battery box 10 shown in FIGS. 7 to 11, connecting elements according to FIGS. 1 to 4 are used which, in a simplified production method, can be inserted into the battery box 10 through the joining section 2 that extends in sections along the outer radius of the appertaining connecting section 5.

In this simplified production method, at first the at least one corner connecting element 6, the at least one side connecting element 7 and the at least one crosswise connecting element 8 are placed onto the baseplate 9. Subsequently, the at least one partition plate 11 is placed onto the baseplate 9 and aligned with the baseplate 9 as well as with the appertaining connecting element 1. Only then are the joining sections welded to the baseplate 9 and only then are the flanges 13 welded to the baseplate 9. Since, in the case of the present connecting elements 1, the joining sections 2 extend along the outer radius of the appertaining connecting section 5, the joining sections 2 project into the cell compartment 18 defined by the side walls 12 and by the partition walls 11, so that the joining sections 2 are accessible for a successive laser welding process in which the weld seams 14 on the joining sections 2 can be formed in a single step.

In contrast, the alternative connecting elements 1 according to FIGS. 5 and 6, first have to be placed onto the baseplate 9 and subsequently welded to the baseplate 9, before the partition plates 11 can be inserted into the battery box 10, since the partition plates 11 cover the joining sections 2 of the connecting elements 1 at least partially, as shown in FIGS. 5 and 6. This embodiment, however, takes up somewhat less space since the fact that there is no part of the connecting element 1 projecting beyond the connecting section 5 reduces the cell compartment 18.

Now, a battery cell 15 can be inserted into the finished cell compartment 18 and can then be screwed to the battery box 10.

A completely assembled battery box 10 is then installed as a modular assembly in the electric vehicle 16. Fundamentally speaking, the battery box 10 can be removed again from the electric vehicle for maintenance purposes or in order to be replaced. The battery cells 15 accommodated in the battery box 10, in turn, can be removed again from the battery box 10. Towards this end, each connection between the battery cell 15 and the connecting section 5 is configured so as to be detachable. In this manner, the connecting elements 1 described above constitute battery cell connecting elements.

The present invention is not restricted in terms of its configuration to the embodiments presented here. Rather, several variants are conceivable which make use of the solution presented here, even in the case of other types of configurations. It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

LIST OF REFERENCE NUMERALS 1 connecting element/battery cell connecting element (=screw boss, screw block, screw node, screw point)
2 joining section (=web)
3 through hole
4 centering cam
5 connecting section (=screw connecting section)
6 corner connecting element
7 side connecting element
8 crosswise connecting element
9 baseplate
10 battery box
11 partition plate
12 side plate
13 joining flange
14 weld seam
15 battery cell
16 electric vehicle
17 central section
18 cell compartment
19 separation area
20 side surface
21 recess

The invention claimed is:

1. A battery box (10) for an electric vehicle (16), comprising:
a baseplate (9);
a connecting element (1) to connect a battery cell (15) of the electric vehicle (16) to the battery box (10), comprising:
at least one connecting section (5) configured for connecting to the battery cell (15) and configured for joining to the battery box (10); and
at least one joining section (2) associated with the at least one connecting section (5), the at least one joining section (2) configured as a sheet-like lamella in order to be securely connected to the battery box (10); and
at least one partition plate (11) to separate a first battery cell (15) from a second battery cell (15);
wherein the at least one partition plate (11) has at least one joining flange (13) that is connected to the baseplate (9) in the same manner as the connecting element (1).

2. The battery box (10) according to claim 1, wherein the joining section (2) is adjacent to the connecting section (5).

3. The battery box (10) according to claim 1, wherein the joining section (2) runs along at least some sections of the outer contour of the connecting element (1).

4. The battery box (10) according to claim 1, wherein the connecting section (5) has a thickness of about 0.75 mm to about 1.75 mm.

5. The battery box (10) according to claim 1, wherein the joining section (2) is configured in one piece with the connecting section (5).

6. The battery box (10) according to claim 1, wherein the connecting element (1) is formed either as a fine-cast component, a cold-extruded component or a sheet-metal component.

7. The battery box (10) according to claim 1, wherein the connecting element (1) is made of a weldable metal or a weldable metal alloy.

8. A battery box for an electric vehicle, comprising:
a baseplate;
a connecting to connect a battery cell of the electric vehicle to the battery box, comprising:
at least one connecting section adapted to connect to the battery cell; and
at least one joining section comprising a sheet-like lamella or web or flange joined to or integrally formed with the at least one connecting section and configured for weldable joining to a baseplate of the battery box;
at least one partition plate to separate a first battery cell from a second battery cell;
wherein the at least one partition plate has at least one joining flange that is connected to the baseplate in the same manner as the connecting element.

9. The battery box of claim 8, wherein the at least one joining section flares outwardly from at least a portion of the at least one connecting section.

10. The battery box of claim 8, wherein the at least one connecting section and the at least one joining section are integrally formed of a same material.

11. The battery box (10) according to claim 1, wherein the connecting element (1) is joined to the baseplate (9) at the joining section (2).

12. The battery box (10) according to claim 1, wherein the baseplate (9) has a first thickness and the at least one joining section (2) has a second thickness, and the first thickness of the baseplate (9) and the second thickness of the at least one joining section (2) exhibit a ratio of about 1:1 to about 1:3.

13. The battery box according to claim 1, wherein the baseplate (9) has a thickness between about 0.5 mm and about 1 mm.

14. A method for the production of a battery box (10) for an electric vehicle (16), comprising:
- arranging at least one partition plate (11) on a baseplate (9) of the battery box (10);
- successively welding the partition plate (11) and at least one connecting element (1) onto the baseplate (9), the connecting element (1) comprising
- at least one connecting section (5) configured for connecting to a battery cell (15) and configured for joining to the battery box (10); and
- at least one joining section (2) associated with the at least one connecting section (5), the at least one joining section (2) configured as a sheet-like lamella in order to be securely connected to the battery box (10).

* * * * *